United States Patent [19]

Akutsu et al.

[11] Patent Number: 4,980,705

[45] Date of Patent: Dec. 25, 1990

[54] PRINT RECORDING HEAD

[75] Inventors: Eiichi Akutsu; Hiroshi Fujimagari; Koichi Haga; Hiroo Soga; Koichi Saito, all of Kanagawa, Japan

[73] Assignee: Fuji Xerox Co., Ltd., Tokyo, Japan

[21] Appl. No.: 278,886

[22] Filed: Dec. 2, 1988

[30] Foreign Application Priority Data

| | | | |
|---|---|---|---|
| Dec. 4, 1987 | [JP] | Japan | 62-305853 |
| Mar. 14, 1988 | [JP] | Japan | 63-58334 |
| Apr. 11, 1988 | [JP] | Japan | 63-87284 |
| Jun. 13, 1988 | [JP] | Japan | 63-143507 |

[51] Int. Cl.5 .............. G01D 15/00

[52] U.S. Cl. .............. 346/155; 346/139 C

[58] Field of Search .............. 346/76 PH, 155, 163, 346/151, 139 C

[56] References Cited

U.S. PATENT DOCUMENTS 4,630,073 12/1986 Kashimoto .............. 346/76 PH

FOREIGN PATENT DOCUMENTS 59-171666 9/1984 Japan .............. 346/155
60-124265 7/1985 Japan .............. 346/155
63-47151 2/1988 Japan .............. 346/155

OTHER PUBLICATIONS

IBM Technical Dis. Bulletin vol.25, No. 4 Sep. 1984, Kuntzleman et al.

*Primary Examiner*—Arthur G. Evans
*Attorney, Agent, or Firm*—Finnegan, Henderson, Farabow, Garrett, and Dunner

[57] ABSTRACT

A plurality of recording electrodes are disposed in parallel form on an elastic metallic thin plate through an insulating layer, a protrusion made of a conductive material is formed in the proximity of the tip of each of recording electrodes, and notched grooves are formed between the recording electrodes to partition the recording electrodes.

14 Claims, 9 Drawing Sheets

PRINT RECORDING HEAD

BACKGROUND OF THE INVENTION

The present invention relates to a print recording head for impressing an image electrical signal onto a print recording medium, and more particularly, to a print recording head for printing an image by heating a print recording medium itself by the impression of an image electrical signal on the print recording medium and by melting and transferring points of an ink layer provided in the print recording medium.

Heretofore, there have been known the following devices as print recording heads of the above description. Namely, there is known a print recording head 100 on whose tip surface there are arranged linearly recording electrodes 101, 101, . . . with a prescribed spacing, and return electrodes 102, 102, . . . , each of which having a contact area greater than that of the recording electrode 101, on both sides of the recording electrodes 101, 101, . . . , as shown in FIG. 1 (Japanese Unexamined Patent Publication No. 171666/84). As shown in FIG. 2, in this device, the recording electrodes 101, 101, . . . and the return electrodes 102, 102, . . . of the print recording head 100 are brought into contact with a heating resistor layer 104 provided on the surface of a print recording medium 103, a current corresponding to an image electrical signal is passed from a recording electrode 101 via heating resistor layer 104, an electrically conductive layer 105, and the heating resistor layer 104 to a return electrode 102 so as to heat the heating resistor layer 104 at the position corresponding to the recording electrode 101 through which the current is passed. The device has a construction by which the portion of an ink layer 106 provided on the surface of the print recording medium 103 is melted by the generated heat, and printing of an image is carried out by transferring the melted ink onto a transfer paper 107.

Further, a print recording head 109 obtained by laminating recording electrodes 111, 111, . . . made of a patterned metallic layer and an insulating film 112 on a platelike rigid body 110 such as ceramic, as shown in FIG. 3, has been proposed for example, Japanese Unexamined Patent Publication No. 124265/85). As shown in FIG. 4, in this device, a current is passed from a recording electrode 111 to the print recording medium 103 so as to heat the heating resistor layer 104 in the same way as in the above. However, instead of providing a return electrode 102 which returns a current from the conductive layer 105, the current in this device is made to be directly led out from the conductive layer 105 to the outside.

However, in the case of the former device of FIG. 1, there equipped are the recording electrodes 101 and the return electrodes 102 on the contact surface with the print recording medium 103, so that the contact area under pressure of the print recording head 100 is increased and the total contact pressure has to be made high, making it difficult to obtain a uniform pressurized contact. In addition, there is another problem such as an increase in the torque on a driving roll to be provided on the back surface of the transfer paper 107, resulting in a deterioration in the reliability of the printing and recording.

Further, in the latter print recording head 109 of FIG. 3, the end surface of the head has to be brought into plane contact with the print recording medium 103. Accordingly, in order to avoid a straight-forward reduction in the contact factor caused by an oblique contact of the print recording head 109 with the print recording medium 103, it becomes necessary to hold the recording head 109 so as to be always perpendicular to the medium 103, leading to a problem that a highly accurate head holding mechanism has to be provided.

In order to solve the above-mentioned problems, the following devices have been proposed. Namely, the first device 119 is obtained, as shown in FIG. 5, by providing an elastic layer 121 on an electrically insulating substrate 120, and a plurality of recording electrodes 122, 122, . . . in parallel on the elastic layer 121. Here, each of the plurality of recording electrodes 122, 122, . . . is covered with an insulating film 123 except for a portion, and a projected electrode 124 consisting of an electrically conductive material is formed on the portion that is not covered with the insulating film 123 for each of the recording electrodes 122, 122, . . . .

In addition, there is proposed another device obtained by using an elastic metallic plate as the substrate for a print recording head, and disposing a plurality of recording electrodes in parallel on the surface of the metallic plate via an insulating layer.

However, the above-mentioned prior art devices have the following problems. Namely, in the case of the former device of FIG. 5, the elastic layer 121 is provided on the substrate 120, so that even when there is attached a material such as dirt on the print recording medium 103 or the surface of the medium 103 is uneven, a satisfactory contact state can be secured to a certain degree by absorbing the resulting floating of the recording electrodes 122 with the elastic layer 121. However, when there is attached small dirt or the like on the print recording medium 103 of the print recording head 119, part of the electrically insulating substrate 120 will be floated by the presence of dirt or the like from the surface of the print recording medium 103 due to high rigidity of the electrically insulating substrate 120. Then, the print recording head 119 itself is floated because of the sufficiently large rigidity of the electrically insulating substrate 120, causing such problem as missing points in the printed image and the resulting unsatisfactory quality of the image.

Moreover, in the latter case, since the electrically insulating substrate 120 itself possesses elasticity, somewhat large unevenness on the surface of the print recording medium 103 can be absorbed. Now, however, the substrate 120 itself has elasticity, so that the tip of the substrate cannot assure linearity along the longitudinal direction, making it impossible to secure a satisfactory contacting condition with the print recording medium 103 and creating such problem as misalignment in the printed image.

Furthermore, a device with a structure as shown in FIG. 6 which is similar to the printing head as shown in FIG. 5 has also been proposed. FIG. 6(*a*) shows a lateral cross-section, while FIG. 6(*b*) stows a longitudinal cross-section of this device. As shown in FIG. 6, on an electrically insulating substrate 120 made of an insulating ceramic, plastic or the like, there are disposed a plurality of recording electrodes 122 formed of an electrically conducting metal (Ni, Cr, Au, Cu, Ta, Ti, Fe, Al, W, Zn, Sn, Pt, Pb, alloys containing these metals, or the like). The electrically conducting substrate 120 and the recording electrodes 122, except for their tips, are covered with an insulating film 123. At these tips there formed protrusions 124 made of an electrically conducting metal (Ni, Cr, Cu or the like) which are connected to the respective recording electrodes 122.

A print recording head 129, in which each electrode body is formed by the recording electrode 122 and the protrusion 124 that are connected to each other, makes a sliding contact with the print recording medium 103 with a tilt of a predetermined angle, as shown in FIG. 7. Here, the print recording medium 103 has a constitution in which a return electrode 105 (Al layer) and an ink layer 106 are laminated on a film like electrically conductive heating resistor layer 104. With the return electrode 105 being grounded, a prescribed amount of current is passed via the recording electrode 122 and the protrusion 124 which correspond to a print dot by causing the protrusion 124 which forms a part of the print recording head 129 to make a sliding contact with the surface of the heating resistor layer 104. Then, the current flows spotwise from the sliding contact portion of the protrusion 124 through the heating resistor layer 104 to the return electrode 105. In this current flow, the portion of the heating resistor layer 104 through which the current is passed is heated up, and ink 106a at the position corresponding to the heated site is transferred to the recording sheet.

However, the life of the prior art print recording head 129 of the above kind is not sufficiently long. This is because the electrode body which ordinarily constructed with a metallic material is operated in a state where it makes a sliding contact with the heating resistor layer 104, so that the surface of the sliding contact is worn out relatively soon, and its exposed surface is oxidized due to heating at the time of ink transfer.

SUMMARY OF THE INVENTION

It is an object of the present invention to provide a print recording head in which a high reliability of making contact with a print recording medium is obtained, the area of contact between an electrode part and the print recording medium is well defined, a sufficient contact is obtained even with a small pressurizing force, and only a small amount of wear of the electrode part is caused, enabling its use over an extended period of time.

It is another object of the present invention to provide a print recording head which attains a high reliability of electrical contact between the electrode part and the print recording medium, a sufficient contact even with a small pressurizing force, a prolonged wear life of the contact electrode part, a high working accuracy, a small wear deformation to the electrode part, small damages to the print recording medium.

It is still another object of the present invention to provide a print recording head which can make a contact with the surface of the print recording medium in a satisfactory condition and obtain an image of high quality even with the structure which allows the head to absorb unevenness or the like on the print recording medium by giving elasticity to a substrate.

It is still further object of the present invention to improve wear resistance of the sliding contact and to prevent oxidation of the exposed surface of the electrode part.

The print recording head in accordance with a first aspect of the present invention, for applying an electrical signal to each of selected spots in a print recording medium of the type including a heating layer and a layer having meltable ink to generate heat within the spot of the heating layer to melt in the ink layer ink adjacent to the spot, is characterized in that it has a plurality of recording elements disposed in parallel on an elastic metallic thin plate of thickness between 30 μm and 800 μm provided with an electrically insulating layer on its surface, protrusions consisting of an electrically conductive material formed in the proximity of the respective tips of the plurality of recording elements and free of any insulating layer, and is provided with notched grooves between adjacent pairs of the recording electrodes at least in the proximity of the tip of the head.

It is desirable to have the surface covered with an electrically insulating layer except for the protrusions. In addition, it is favorable to use the elastic metallic thin film with thickness in the range of 30 μm to 800 μm.

The print recording head in accordance with a second aspect of the present invention is characterized in that it is provided with a plurality of recording electrodes on a substrate, a contact electrode part is formed in the proximity of each of the plurality of recording electrodes, and the surface of each of the contact electrode parts is formed with a layer consisting of a compound material of a metallic matrix material and ceramic particulates.

It is desirable that there are provided notched grooves between adjacent recording electrodes at least at the tip part of the plurality of recording electrodes.

In addition, the surface may be covered with an electrically insulating layer except for the contact electrode parts.

Further, the substrate on which are disposed the recording electrodes is desirable to be made of an elastic material.

The print recording head in accordance with a third aspect of the present invention has a constitution in which there are provided a plurality of recording electrodes placed in parallel on an elastic substrate, with the tip of the substrate being projected beyond the tip of the recording electrodes, and a bent portion is formed at the tip part of the substrate by bending the projected part of the substrate to a back side of the recording electrodes.

As for the elastic substrate, for example, a metallic plate may be used. It is not limited to this choice, but plastic or the like may be used as long as it has elasticity.

Further, as for the recording electrodes formed on the substrate, for example, electrically conductive materials are formed in bandlike shape on the surface of the substrate via an insulating layer so as to be aligned in parallel with each other. On the tip of the recording electrode there is provided a protruded electrode, and it is desirable to let the protruded electrode alone make contact with a print recording medium.

Moreover, as for the bent part to be provided on the tip of the substrate, the tip of the substrate may be bent by a prescribed angle where the bending angle, although arbitrary, is desirable to be in the range of 30 to 150 degrees.

In the print recording head in accordance with a fourth aspect of the present invention, it is presumed that a print recording head has a plurality of electrode bodies for carrying out spotwise current flowing in the state of sliding contact with the electrically conductive heating resistor layer. In this print recording head, an electrically conductive ceramic layer is formed on a sliding contact surface of each cf the electrode bodies.

A further aspect of the present invention is a method of using a print recording head, including the steps of bringing protrusions of flexible, partially separable recording elements of the head into slidable contact with a print recording medium of the type including heating and ink-bearing layers; and applying an electrical signal to selected ones of the elements to cause the heating layer to heat contacted spots of the medium to melt ink from only portions of the ink-bearing layer adjacent to areas defined by the sliding contact.

DETAILED DESCRIPTION OF THE PREFERRED EMBODIMENTS

The print recording head in accordance with a first aspect of the present invention is utilized in obtaining an image by means of a conduction recording system. Namely, a print recording head is pressure-contacted to a print recording medium having an ink layer which is melted by being heated, and a plurality of recording electrodes are brought to contact with the print recording medium so as to slide over it. A heating layer of the print recording medium is heated in response to an electrical signal of image sent from the print recording head, ink in the ink layer adjacent to the head is melted and transferred to a transfer material, thereby achieving recording. In this case, a print recording contact section exists on an elastic metallic thin plate, so that even when there is an unevenness or undulation on the surface of the print recording medium which is the surface of contact under pressure, the head follows such an irregularity by means of excellent elasticity of the elastic metallic thin plate, obtaining a stabilized condition of contact. Moreover, in the elastic metallic thin plate there are provided notched grooves so as to be located between every adjacent pair of the electrodes or between every adjacent small groups of the electrodes. Therefore, there is realized a pressurized contact condition in which each single recording electrode is independent of another or each small group of recording electrodes is independent of another group. As a result, even if there occurs floating of a recording electrode due to dust or a foreign object, the system works to minimize the influence on the whole print recording head, and hence printing and recording can be carried out in a stabilized condition.

Moreover, in the case where the print recording head of the present invention is covered with an electrically insulating film excluding projections made of an electrically conductive material formed in parts of the recording electrodes, only the protrusions are made contact with the print recording medium, which acts to control the area of the contacting portion. Consequently, the contact pressure for the whole print recording head can also be reduced significantly.

In what follows, an embodiment of the first aspect of the present invention will be described in detail with reference to the drawings.

Figure 8A:
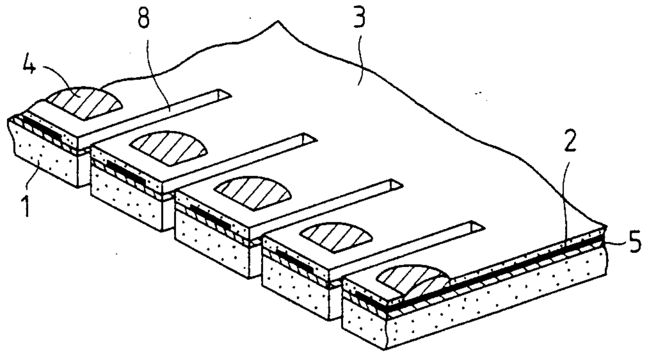
FIG. 8 shows an embodiment in accordance with a first aspect of the present invention in which FIG. 8(*a*) is a perspective view, FIG. 8(*b*) is a lateral sectional diagram and FIG. 8(*c*) is a longitudinal sectional diagram.
Figure 8B:
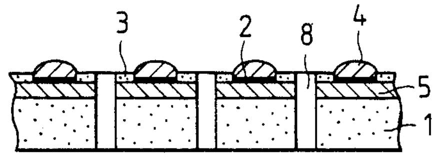
Figure 8C:
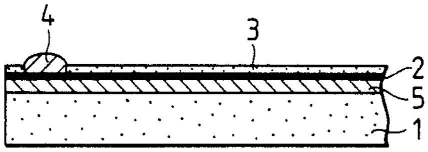

FIG. 8 shows an embodiment of the present invention in which FIG. 8(*a*) is its perspective view, FIG. 8(*b*) is a lateral cross-sectional diagram and FIG. 8(*c*) is a longitudinal cross-sectional diagram. In this embodiment, a substrate is constructed by providing an electrically insulating layer 5 on an elastic metallic thin plate 1. On the substrate, there are disposed in parallel a plurality of recording electrodes 2 which are covered with an insulating film 3 excluding partial regions in the proximity of their tips. At the exposed parts of the recording electrodes that are not covered with the insulating film, there are formed protrusions 4 made of an electrically conductive material. Further, at the tip part of the print recording head there are formed notched grooves 8 between the adjacent recording electrodes 2.

The desirable range of thickness for the elastic metallic thin plate is 30 μm to 800 μm. If it is thinner than 30 μm, a sufficient elastic characteristic and an appropriate pressure for pressurized contact cannot be obtained. On the other hand, if it is thicker than 800 μm, the elastic metallic thin plate exhibits a more rigid behavior than the elastic body, so that satisfactory effects cannot be obtained.

Since the elastic metallic thin plate is electrically conductive, it is necessary to provide the electrically insulating layer 5 by giving an insulation processing prior to forming the recording electrodes 2. Following methods may be utilized for the insulation processing: sputtering, vapor deposition, sintering, PVD method, CVD method, and the like for insulating ceramic or the like; or coating, vacuum vapor deposition, and formation by plasma deposition, and the like for an insulating organic film. The desirable range of the thickness of the electrically insulating layer 5 is 600 Å to 10 μm. Any material can be used as the electrically insulating layer 5 as long as the specific volume resistivity is greater than $10^4$ Ωcm. For example, a ceramic material such as $SiO_2$, $Al_2O_3$, SiN, AlN, $TiO_2$, TaN or the like, or an insulating resin such as polyimide, polyimideamide, polyester or the like can be used preferably.

On the electrically insulating layer 5, there are formed the recording electrodes 2 by placing them in parallel in band form. As a material for the recording electrode, there may be utilized, for example, an electrically conductive metal (Ni, Cr, Au, Ta, Ti, Fe, Al, Mo, W, Zr, Sn, Pt, Pb, and an alloy including these elements), a conductive metallic compound ($VO_2$, $RuO_2$, TaN, $Ta_2N$, $HfB_2$, $TaB_2$, $MoB_2$, $CrB_2$, $B_4C$, MoB, ZrC, VC, TiC and the like), and a mixture including these substances. The specific volume resistivity required for such a material need to be smaller than 100 Ωcm. A recording electrode 2 consisting of such a material can be formed by selecting a method from among foil bonding, electrolytic plating, electroless plating, vacuum vapor deposition, sputtering, printing or other method of coating, PVD method, CVD method, plasma deposition, or the like in accordance with the material and the substrate material, making the thickness of the film to be 0.1 to 50 μm. The recording electrodes 2 which are patterned in stripe form can be obtained by patterning a metallic film with a combination of lithography by the use of a laser and wet etching or dry etching. Or, the recording electrodes 2 can be formed by directly drawing a conductive layer.

On the patterned recording electrodes 2 there is applied a covering by means of an insulating film 3. In that case, covering is carried out so as to expose the recording electrodes 2 at the tip parts or in the proximities of the tip parts of the recording electrodes 2. For example, a photosensitive insulating film (dry film) is thermally bonded, and the portions of the recording electrodes 2 corresponding to the portions that make contact with the print recording medium are removed by photolithography and wet etching to expose those portions. Further, instead of using a photosensitive insulating film, recording electrodes 2 may be exposed by thermally bonding an insulating film or using a resist film with an inorganic insulating film attached, and using a combination of photolithography and dry etching. Preferable range of the thickness of the insulating film 3 is 0.5–50 μm.

On the portions of the recording electrodes 2 that are not covered with the insulating film 3, namely, the exposed portions, there are formed protrusions 4. The shape and the size of the exposed portions may be anything as long as adjacent recording electrodes 2 do not make mutual contact. However, rectangular or circular shape is preferable, and the size of about the width of the electrode 2 is preferable.

The protrusions 4 are formed on the exposed portions of the recording electrodes by attaching a conductive metal (Ni, Cr, Cu or the like) by, for example, electrolytic plating so as to have greater thickness than that of the insulating film 3. It is preferable for the protrusion 4 to be projected by 2.0–100 μm, in particular 10–40 μm, from the insulating film 3. With these protrusions 4, the contact area of the electrode can be confined, and a satisfactory result for the recording dot shape can be obtained.

In FIG. 8, the protrusions 4 of the recording electrodes are aligned in a line. However, they may be arranged staggered, or in a state in which three or more electrodes are arranged in saw-tooth form.

The notched grooves 8 provided between the recording electrodes 2 may be formed by a rotary cutting method by means of a cutting disk, laser cutting method, dry etching method, fluid cutting method or the like. The desirable depth of the notched groove 8 is 5–40 mm from the end of the print recording head. However, it can be determined arbitrarily depending upon the shape of the exposed part 4 of the recording electrode without being restricted significantly by the shape.

Next, further concrete example of the print recording head according to the first aspect of the present invention will be described.

EXAMPLE 1

On an SUS304 plate with thickness 150 μm, $SiO_2$ film was deposited by a high frequency sputtering method at the substrate temperature of 250° C. to form a thin film of 1,000 Å. Next, Ni was deposited to form a thin film of thickness 5,000 Å by a high freqrency sputtering method at the substrate temperature of 250° C. On the film formed an electrode pattern regist was formed by photolithography, and a stripe-like conduction part with width 60 μm and a pitch 125 μm was formed by dry etching using oxygen plasma. Next, the substrate was placed in a nickel plating bath to form a nickel film of 20 μm thickness over the conduction part by plating, and stripe-like recording electrodes were formed. Next, a photosensitive polyimide oligomer was applied on it to form an insulating film with 5 μm thickness, and square exposed parts each with dimensions of 65 μm×65 μm were formed 10 μm inside from the ends of the recording electrodes by exposure and development processes. The tip portion of the substrate was immersed in a nickel bath and nickel plated layers with thickness of 18 μm were formed in the exposed parts by passing a current. By so doing, protrusions with a 78 μm×78 μm area and 15 μm projection were formed. Next, notched grooves with pitch 500 μm and width 30 μm were formed between the recording electrodes by using a precision disk cutter.

Next, the formed print recording head was contacted with various pressures to an aluminum drum with diameter 60 mm at a contact angle of 20 degrees. Conduction reliability between the protrusions and the aluminum drum was evaluated while turning the drum at a linear velocity of 200 mm/sec. The result of the evaluation was represented by the number of times in which non-conduction of greater than 1 ms occurred under pressurized contact of 10 seconds. Result of the evaluation is shown in Table 1.

COMPARATIVE EXAMPLE 1

A print recording head with similar construction was manufactured in a similar manner as in Example 1 except for the use of 1.2 mm thick SUS304 plate, and the sample was evaluated in the same way as before. Result of the evaluation is also given in Table 1.

COMPARATIVE EXAMPLE 2

Figure 9:
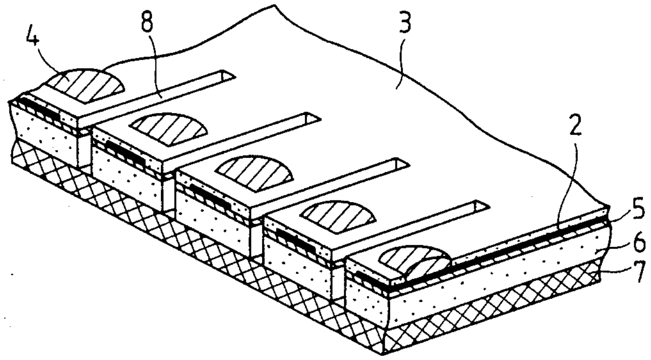
FIG. 9 is a perspective view of a print recording head of Comparative Example 2.

In place of the SUS304 plate used in Example 1, a laminated plate consisting of a 5 mm thick SUS304 plate (pressure-contact plate) and a 3 mm thick elastic plate with rubber hardness 40 were used. An electrode pattern and conductive protrusions were formed on a film, and the film was bonded to obtain a print recording head as shown in FIG. 9 in the same way as in Example 1, and evaluated similarly. In FIG. 9, reference numeral 6 is the elastic material, 7 is the pressure-contact plate, and other components are as described before. Result of the evaluation is also included in Table 1.

TABLE 1

| | Contact Pressure (g/cm) | | |
|---|---|---|---|
| | 150 | 600 | 1000 |
| Example 1 | 12 | 1 | 0 |
| Comparative Example 1 | 1759 | 55 | 183 |
| Comparative Example 2 | 137 | 18 | 3 |

In the print recording head in accordance with the first aspect of the present invention, an elastic metallic thin plate with an electrically insulating layer on its surface is used as the substrate and protrusions are provided on the recording electrodes. Therefore, it is possible to prevent such miscontact of the recording electrode with the print recording medium that might be caused by floating of the electrode due to unevenness or undulation in the print recording medium. In addition, the contact area between the electrode and the medium can be reduced, so that it has become possible to maintain a satisfactory contact condition between the electrode and the medium even with a smaller contact pressure. Consequently, the invention contributes to prolong the life of the print recording head and to reduce the wear of the print recording medium.

Furthermore, because of the presence of the notched grooves between the recording electrodes, the following effects can be realized. Namely, (1) the adjacent recording electrodes are separated with each other via the notched groove, so that the influence of dust, dirt, or the like found in the area of one electrode on other electrodes can be made small; (2) the print recording head dynamically secures contact condition and hence can prevent propagation of fine vibrations, and when there exists a fine foreign object, it is possible to remove the foreign object by sweeping it out through a notched groove; (3) contact reliability of each recording electrode can be enhanced, so that the contact pressure can be reduced, which can contribute to the wear characteristic of the print recording medium, enhancement of reliability and life prolongation of stylus contact part; and (4) a marked improvement of elastic characteristics such as enhancement of temporal elastic response, extension of elastic limit and the like.

The print recording head in accordance with a second aspect of the present invention is used in obtaining an image by means of conduction transfer recording system or electrostatic recording system. For instance, in the conduction transfer recording system, the print recording head is brought into pressure contact with the print recording medium having a heater layer and a heat-melting ink layer, and a plurality of recording electrodes are brought into contact with the print recording medium so as to slide over it. Recording of an image is carried out by inputting an image electrical signal from the print recording head to the heater layer, generating Joule heat within the heater layer, melting the adjacent positions of ink layer by the heat in response to the image shape and transferring the ink layer to a transfer material (usually a paper sheet).

In this case, the contact electrode part is composed of a metallic matrix material and ceramic particulates, so that it has a satisfactory resistance to abrasion, and can work over a long period of time.

In the print recording head of the present invention, when the substrate consists of an elastic material, the print recording head can deform in response to an unevenness or undulation in the print recording medium even when there is such on the surface of the medium. Accordingly, the contact electrode parts provided on the tips or in the proximity of the tips of the recording electrodes are kept at a stabilized contact condition for all time.

When there are provided notched grooves between the recording electrodes, these recording electrodes find themselves in a condition of independent pressurized contact as each individual electrode or as a group of a plurality of electrodes. Therefore, even when there is placed a foreign object such as dirt in the recording electrode part, there will not occur a floating of the whole print recording head. Moreover, even when there occurs a floating in a part of the head, influence of the floatation on other recording electrodes can be made small.

Moreover, when the recording electrodes are coated with an electrically insulating layer except for the contact electrode parts which are formed in parts of the recording electrodes, only the contact electrode parts are allowed to make contact with the print recording medium, which controls the area of the contacting part. Consequently, the contact pressure of the whole print recording head can be reduced markedly.

Referring to the drawings, the second aspect of the present invention will be described in detail.

Figure 10A:
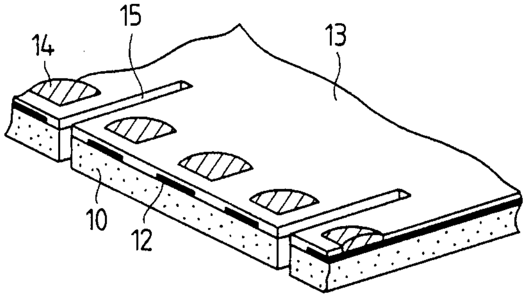
FIG. 10 shows an embodiment in accordance with a second aspect of the present invention in which FIG. 10(*a*) is a perspective view, FIG. 10(*b*) is a lateral sectional diagram and FIG. 10(*c*) is a longitudinal sectional diagram.
Figure 10B:
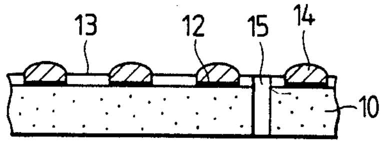
Figure 10C:
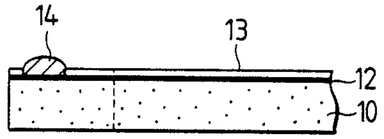

FIG. 10 shows an embodiment, where FIG. 10(*a*) is a perspective view, FIG. 10(*b*) is a lateral cross-sectional diagram and FIG. 10(*c*) is a longitudinal cross-sectional diagram. On a substrate 10 a plurality of recording electrodes are patterned and arranged in parallel, and the recording electrodes 12 are covered with an insulating film 13 except for partial regions in the proximity of the tips of the recording electrodes. In the exposed portions of the recording electrodes 12 which are not covered with the insulating film 13, there are formed contact electrode parts 14. In addition, in the tip portions of the print recording head there are provided notched grooves 15 between the recording electrodes 12.

As the substrate 10, a resin plate having elasticity, a ceramic plate, a metallic plate having an insulating layer, a rubber material having a pressure-bonded plate on its back, a resin plate material or the like is used.

On the substrate 10 there are formed a plurality of recording electrodes 12 in stripe form in parallel. As the material for the electrodes, for example, metals such as Cu, Au, Al, Ru, Ni, Ag, Co, Ta, alloys which include a plurality of these metals are preferably used. For the recording electrodes 12 consisting of such an electrode material, selection may be made from among methods of foil bonding, electro-plating, electroless plating, vacuum vapor deposition method, sputtering method, printing method or the like, PVD method, CVD method, plasma deposition method and the like, in accordance with the material and the substrate material, to form a film with thickness of 0.1 μm to 50 μm. Patterned stripe-like recording electrodes 12 can be formed by patterning a deposited conductive layer by a combination of wet etching or dry etching and lithography which employs a light, laser or electron beam. Otherwise, patterned recording electrodes 12 may be formed by directly drawing a conductive layer.

Patterned recording electrodes 12 are then covered with an insulating film 13. In doing so, the proximity of the tip of each of the recording electrodes 12 is left uncovered so as to expose the recording electrode 12. This can be done, for example, by thermally pressure-bonding a photosensitive insulating film (dry film), and the portions of the recording electrodes 12 corresponding to the areas that make contact with the print recording medium are removed by photolithography and wet etching to expose the recording electrodes 12. Instead of using the photosensitive insulating film, the recording electrodes 12 may be exposed, by thermally pressure-bonding an insulating film and exposing electrodes by the use of a regist film and a combination of photolithography and dry etching. Thickness in the range of 5 μm to 50 μm is used preferably for the insulating film 13.

The portion that is not covered with the insulating film 13 of the recording electrodes 12, namely, the exposed portion, is covered with a layer (contact electrode part 14) of a compound material consisting of a metallic matrix material and ceramic particulates.

The compound material of a metallic matrix material and ceramic particulates is in a state where ceramic powder is dispersed in the metallic matrix material. As the metallic matrix material, there may be used of Ni, Co, Au, Cr, Cu, Rh, W and Mo, and as the ceramic particulates there may be used $Al_2O_3$, BN, SiC, $B_4C$, NiO, $Cr_2O_3$, $Si_3N_4$, TiC, $TiO_2$, WC, $WSi_2$, $ZrO_2$, $ZrB_2$, ZrC, $Cr_3C_2$, TaC, MgO, CaO, $ThO_2$ and the like. The mean diameter of the particulates is preferred to be in the range of 500 Å–10 μm, in particular in the range of 0.3 μm–3 μm, from the viewpoint of satisfactory characteristics of the film obtained. Further, the thickness of the layer consisting of the compound material is preferred to be in the range of 1 μm–70 μm, and the satisfactory range is about 5 μm–20 μm from the viewpoint of the ease in film formation and the strength and uniformity of the film itself.

Further, the ratio of the ceramic particulates to the metallic matrix material is satisfactory when the ceramic particulates within the layer consisting of the compound material is in the range of 2–37% by volume. When the ratio of the ceramic particulates is smaller than 2 vol. %, strength and abrasion property of the layer consisting of the compound material are not much improved compared with the case of a layer consisting only of the metallic matrix material. On the other hand, when it is greater than 37 vol. %, electrical conductivity of the compound electrode becomes unstable, or its resistance is increased, or there occurs brittleness due to nonuniformity within the electrode.

A layer consisting of the compound material is formed by electrolytic composite plating. The condition for film formation is preferred to have current density of 0.5-25 A/$dm^2$. It leads to an unsatisfactory efficiency of yield with low formation speed when the current density is smaller than 0.5 A/$dm^2$. Further, when the current density is greater than 25 A/$dm^2$, uniformity and stability of the film is spoiled due to a rise in the temperature of the plating bath.

A film consisting of a compound material which has been formed by the electrolytic composite plating has a film quality which is dense with fewer cavities within the layer. In addition, the film surface is smooth, and such phenomena as stress concentration breakdown of a sliding material, damage to the slide-receiving material, or the like can be avoided or reduced.

The contact electrode part 14 formed by a layer consisting the compound material is formed so as to become a protrusion by attaching the layer to have a thickness greater than that of the insulating film 13. The protrusion is preferred to be projected by 2.0–100 μm, and in particular by 10–40 μm, from the surface of the insulating film. The shape of the protrusion may be rectangular, circular, polygonal, elliptical or the like, and is not under any special limitation. In addition, its size may fundamentally have a value which is close to the width of the recording electrode 12 on the substrate. However, depending upon the width of the electrode part 14, or the way in which the contact electrode parts 14 are arranged, it may be several times greater than, or a fraction of the recording electrode 12.

It is preferable to provide notched grooves 15 between the recording electrodes 12. The notched grooves 15 may be provided at all of the positions between the recording electrodes or for every several to tens of the recording electrodes 12. Because of the independent pressurized contact of each recording electrode 12 or each electrode group, reliability of their contact with the print recording medium can be enhanced markedly.

The notched grooves 15 can be formed by means of rotary cutting method using a cutting disk, laser cutting method, dry etching method, fluid cutting method or the like. The depth of the notched grooves 15 is satisfactory when it is in the range of 5–45 mm from the end of the print recording head. However, it may be determined arbitrarily depending upon the exposed positions of the recording electrodes 12.

Next, more concrete embodiments of the print recording head according to the second aspect of the present invention will be shown.

EXAMPLE 2

An electrically conductive layer was formed on one side of partially stabilized zirconia plate with thickness of 250 μm by depositing 500 Å of chrome film by a vacuum vapor deposition method, and a gold film with thickness of 3.0 μm by an EB vacuum vapor deposition method.

Next, a conductive layer was patterned by photolithography and then etched to form stripe-like recording electrodes with a pitch of 125 μm and electrode width of 100 μm. Next, on the side where recording electrodes are formed, an $SiO_2$ insulating film with thickness of 6,000 Å was provided by high frequency sputtering method at the substrate temperature of 150° C.

Next, square openings with 60 μm sides were formed in the insulating film directly above the recording electrodes by photolithography and hydrofluoric acid etching to expose the metal of the recording electrodes. Plated layers were formed on the exposed portions. Namely, a composite plating solution was prepared by adding SiC particulates with mean particle diameter of 0.7 μm to a plating solution consisting of nickel sulfamate with concentration of 35% by weight with a proportion of 300 g SiC particulates per a liter of the plating solution. A plated layer consisting of the compound material with film thickness of 18 μm was formed by carrying out electrolytic plating under the condition of current density of 8.0 A/dm$^2$ with separating speed of about 1 μm/min, with stirring the plating solution. The SiC content in this plated layer was 12 vol. %. In this manner, roundish square contact electrode parts with sides of about 80 μm, projecting by about 15 μm were formed at the exposed portions. Then, the sample was subjected to a heat treatment in gaseous nitrogen at about 350° C. for about 2 hours.

Next, notched grooves with width of 20 μm and length of 2.5 mm were formed with a pitch of 2.0 mm to obtain a print recording head.

The print recording head thus obtained was subjected to an evaluation of the sliding time versus abrasion quantity by bringing the head into contact with a smooth aluminum drum with 120 mm diameter under a contact pressure of 100 g/cm with a contact angle of 18°, while turning the drum and applying an input current of 1A per 1 cm of the head length with pulse width of 200 μs and a pulse duty factor of 10%. The result of the evaluation is shown in Table 2.

COMPARATIVE EXAMPLE 3

A print recording head similar to that in Example 2 was manufactured. However, there was one difference in that the contact electrode parts were manufactured by using a nickel plating solution which did not contain SiC particulates. The result of the evaluation done in the same way as in Example 2 is shown in Table 2.

TABLE 2

| | Operating Time | | | |
|---|---|---|---|---|
| | 100 hours | 300 hours | 500 hours | 800 hours |
| Example 1 | ≦3 μm | ≦3 μm | ≦3 μm | ≦3 μm |
| Comparative Example 1 | ≦3 μm | ≦3 μm | 5 μm | 6 μm |

EXAMPLE 3

An insulating layer was provided by coating one side of a stainless steel plate with thickness of 0.2 mm with a solution dispersed with $SiO_2$ powder by a dip coating method, and an $SiO_2$ film with thickness of 10 μm was formed by sintering. Next, an aluminum layer with thickness 500 Å was formed by depositing aluminum by a DC sputtering method, and then a copper layer with thickness 1.2 μm was formed by depositing copper by a sputtering vapor deposition method. Next, the conductive layer was patterned by photolithography and etching to form stripe-like recording electrodes with a pitch of 100 μm and width of 50 μm. Next, a polyimide oligomer was applied to the side of the recording electrodes formed, and after presintering, square openings with sides of 45 μm were created by photolithography and etching of a second time. After that, the polyimide oligomer was heat-cured in gaseous nitrogen. The thickness of the polyimide insulating film formed was 2.5 μm.

Next, a plated layer was formed on the exposed portions. Namely, using a composite plating solution obtained by dispersing BN particulates with mean particle diameter of 1.0 μm in a plating solution of cobalt sulfamate with concentration of 25 wt. % with the rate of 25 g BN particulates per a liter of the plating solution, a current with density of 10 A/dm$^2$ was passed for 10 min, while stirring the solution constantly, to form a plated layer with thickness of 24 μm consisting of the compound material. The content of BN in the plated layer was 9 vol. %. In this way, contact electrode parts with diameter of 80 μm, projected by about 22 μm from the polyimide insulating layer, was formed at the exposed portions of the recording electrodes. The sample was subjected for 2 hours to a heat treatment in gaseous nitrogen at about 350° C.

The print recording head thus obtained was brought into contact, at a contact angle of 15° and with contact pressure of 120 g/cm, with a smooth aluminum drum of diameter 200 mm and thickness 2 mm, and a current was passed at the input current quantity of 1A per 1 cm of head length with pulse width of 200 μs and a pulse duty factor of 20%, while turning the drum at the linear velocity of 200 mm/sec. The relationship between the sliding time and the abrasion quantity was evaluated. The result of the evaluation is shown in Table 3.

COMPARATIVE EXAMPLE 4

A print recording head was manufactured in the same way as in Example 2, except that a plated copper layer was formed as the contact electrode parts. Result of the evaluation done in the same way as in Example 3 is shown in Table 3.

TABLE 3

| | Operating Time | | |
|---|---|---|---|
| | 100 hours | 400 hours | 1000 hours |
| Example 3 | ≦3 μm | ≦3 μm | 4 μm |
| Comparative Example 4 | ≦3 μm | 7 μm | 15 μm |

In the print recording head in according with the second aspect of the present invention, there were formed contact electrode parts in the recording electrodes. The contact electrode parts are made of a compound material consisting of a metallic matrix material and ceramic particulates, so that the wear life of the contact electrode parts has been prolonged and printing and recording for a long period of time has been become possible.

In addition, when the contact electrode parts form protrusions, it becomes possible to maintain a satisfactory contacting condition with the print recording medium even with the small contact pressure. Consequently, the head can contribute further to extend the life of the print recording head with less abrasion of the print recording medium.

Moreover, when there are provided notched grooves between the recording electrodes, there can be obtained the following effects. Namely, (1) even when a recording electrode part is floated due to foreign object such as dust or dirt, there will be no floating of the whole print recording head. In addition, it is possible to prevent nonuniformity of pressure due to unevenness in the position and accuracy of condition of pressurized contact, or one-sided contact, of the print recording head. Further, even when there occurs a floating in a part of the print recording head, its influence to other electrodes can be reduced. (2) When there is a foreign object, it is possible to sweep it out into a notched groove, so that the foreign object can be removed easily. (3) The contact reliability of each recording electrode can be enhanced, so that the contact pressure of can be reduced, contributing to the abrasion characteristic of the print recording medium and enhancement of reliability and prolongation of life of the stylus contact part.

In addition, when a thin resin substrate having elasticity is used, it is possible to prevent faulty contact of the recording electrodes caused by their floating due to unevenness or undulation in the print recording medium. Moreover, working of the substrate is easy, so that it becomes possible to manufacture a substrate of complicated shape with high accuracy.

Furthermore, when the recording electrodes are covered with an electrically insulating layer except for the portions consisting of a conducting material formed at parts of the recording electrodes, only the protrusions made of a conductive material make contact with the print recording medium. Accordingly, contact pressure of the whole print recording head can be reduced markedly, and the contact stability between the contact electrode parts and the print recording medium can be enhanced.

In a third aspect of the present invention, a bending part is formed on the tip of an elastic substrate so as to provide rigidity to the tip of the substrate. As a result even if the substrate is provided with elasticity, it is possible to secure a satisfactory contacting condition by preventing the occurrence of an undesirable deformation on the tip of the substrate.

In what follows the third aspect of the present invention will be described with reference to the drawings.

Figure 11:
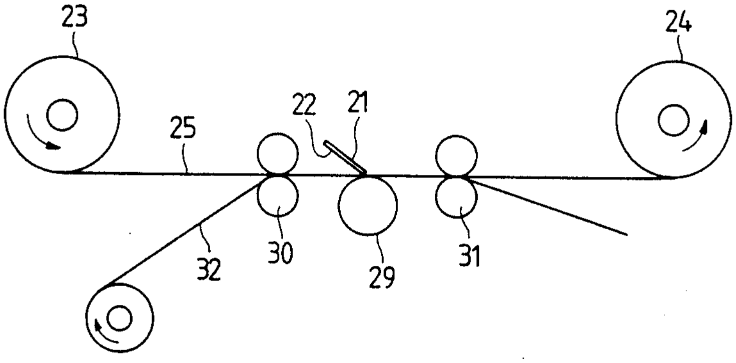
FIG. 11 is a schematic diagram showing an image recording device to which can be applied a print recording head in accordance with a third aspect of the present invention.
Figure 12:
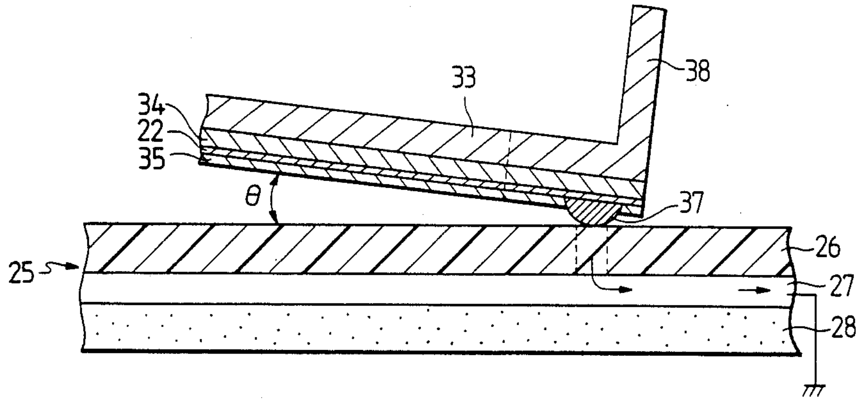
FIG. 12 is an enlarged cross-sectional diagram for the main part of the device of FIG. 11.

FIG. 11 shows an image recording device to which the print recording head of the present invention can be applied. In the figure, reference numeral 21 is a print recording head and it has a plurality of recording electrodes 22, 22, . . . arranged with a predetermined spacing. The print recording head 21 makes currents flow in accordance with an image signal to a print recording medium 25 which is supplied from a supply roll 23 and is wound to a take-up roll 24. Namely, the print recording head 21 makes currents conduct, as shown in FIG. 12, from the recording electrodes 22, 22, . . . via a heating resistor layer 26 provided on the surface of the print recording medium 25 to an electrically conductive layer 27 which is connected to the ground, to heat the heating resistor layer 26 in response to an image to be recorded. By the heat generated in the heating resistor layer 26, an ink layer 28 provided on the back surface of the conductive layer 27 is melted, and the image is printed and recorded on a transfer paper 32 which is brought into pressurized contact with the print recording medium 25 by means of the print recording head 21 and a back roll 29 and is held between and conveyed by conveyer rolls 30 and 31. Here, a contact angle 0 between the print recording head 21 and the rear roll 29 is set ordinarily in the range of 5°–20°.

Figure 13:
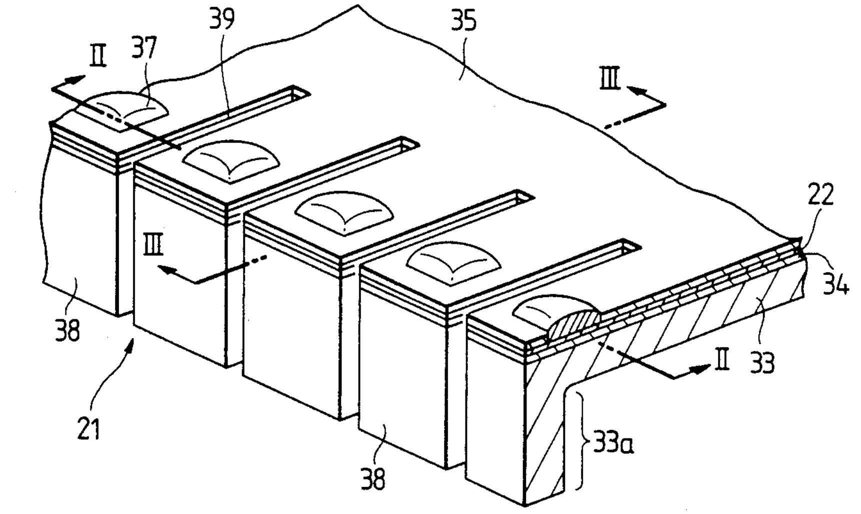
FIG. 13 is a perspective view showing an embodiment of a print recording head in accordance with the present invention.
Figure 14:
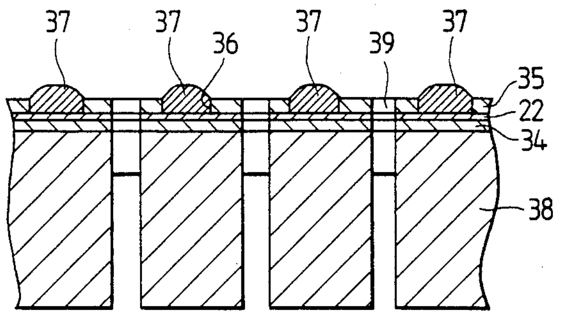
FIG. 14 is a cross-sectional diagram taken in the plane along the line II—II of FIG. 13.
Figure 15:
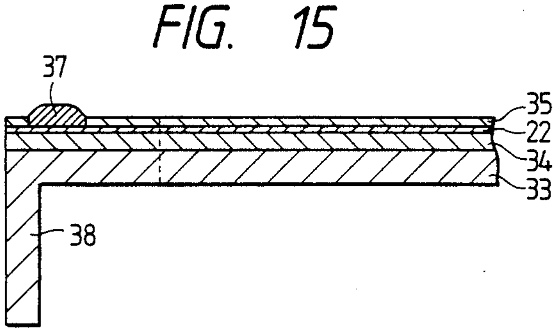
FIG. 15 is a cross-sectional diagram taken in the plane along the line III—III of FIG. 13.

FIG. 13 to FIG. 15 show a print recording head in accordance with an embodiment of the third aspect. This print recording head 21 has an elastic substrate 33 which has length that is approximately equal to the width of the print recording medium 25 and is formed into a rectangular shape with predetermined width. The substrate 33 is made of a member such as metal or plastic that has elasticity. As the metallic material, there may be used stainless steel, copper material, phosphor bronze material, iron material, tungsten material or the like, and preferably various kinds of rolled materials containing materials just mentioned. Further, as the plastic material, there may be used polyacetal, polyamideimide, polyimide or the like.

The thickness of the substrate 33 may naturally vary from one material to another, but it is desirable to lie in the range of 40–700 μm. When the substrate 33 L has the thickness smaller than 40 μm, it is unsatisfactory because, in bringing the print recording head 21 into pressurized contact with the print recording medium 25, a sufficient elastic characteristic and contact pressure cannot be secured, resulting in a reduction of the contact pressure and a rise in the contact resistance. On the other hand, the substrate 33 thicker than 700 μm is also undesirable, because its elasticity is reduced, requiring larger pressure for the pressurized contact, and shows strength similar to a rigid body. Here, the contact pressure of the substrate 33 is desirable to be in the range of 10 g/cm to 1,000 g/cm from the viewpoint of actual use of the substrate. Therefore, the thickness of the substrate is preferred to be in the range of 60–250 μm.

When the substrate 33 is formed of a metal, since it is electrically conductive, it is necessary to form an electrically insulating layer 34 on the surface of the substrate 33 as a pre-processing before the formation of recording electrodes 22, 22, . . . on the surface of the substrate 33. The insulating layer 34 can be formed as a sputtered film, vapor deposited film, sintered film, PVD film, or CVD film of an insulating material such as insulating ceramic; or by coating, plasma deposition, vacuum vapor deposition or the like of an organic insulating material film.

The specific volume resistivity of the material forming the insulating layer 34 will be satisfactory if it is greater than $10^4$ Ωcm, and the higher the value, the more satisfactory. Further, the thickness of the insulating layer 34 is preferable to be in the range of 1,000 Å to 10 μm. When it is thinner than 1,000 Å, it is not desirable because there are produced defects (pinholes, unevenness and cracks) in the insulating layer 34 and short-circuit tends to occur when a metallic material is used for the substrate 33. On the other hand, when it is thicker than 10 μm, it is not desirable because it may lead to loss of elasticity of the substrate 33 or a reduction in adhesivity of the insulating layer 34. As the material for the insulating layer 34, an insulating ceramic material such as $SiO_2$, $Al_2O_3$, SiN, AlN, $TiO_2$, TaN, and insulating resin such as polyimide, polyimideamide, polyester, epoxy resin are suitable.

Figure 16:
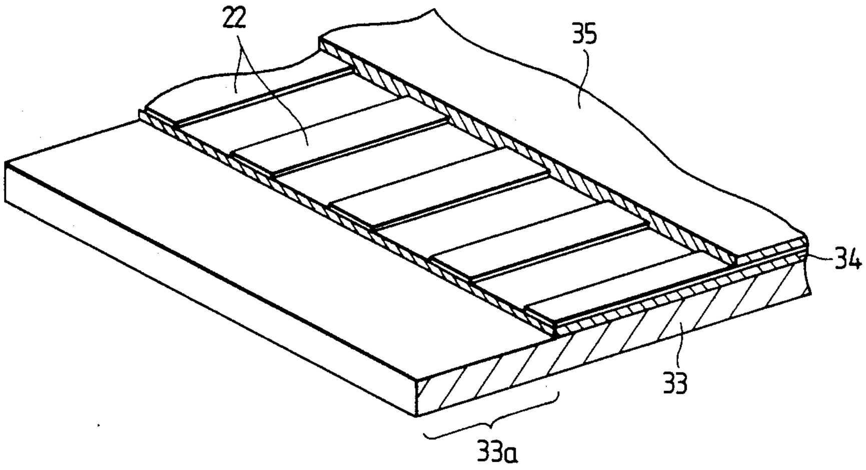
FIG. 16 is a perspective view showing recording electrodes.

On the surface of the insulating layer 34, a plurality of recording electrodes 22, 22, . . . are provided, and these recording electrodes 22, 22, . . . are arranged linearly and in parallel with a predetermined spacing as shown in FIG. 16. As the material for the recording electrodes 22, 22, . . . , Ni, Cr, Au, Ta, Ti, Fe, Al, Mo, W, Zn, Sn, Pt, Pb, B, and alloy materials containing these elements are suitable. Also, there can be used a conductive ceramic material such as $VO_2$, $RuO_2$, TaN, $Ta_2N$, $HfB_2$, $TaB_2$, $MoB_2$, $CrB_2$, $B_4C$, MoB, ZrC, VC, TiC and a mixture consisting of two or more of these materials.

It is required for the recording electrodes 22, 22, . . . to have specific volume resistivity smaller than 10 Ωcm, and it is more desirable that the value of the specific volume resistivity is smaller. Further, the recording electrodes 22, 22, . . . are formed by appropriately selecting one method in accordance with the materials of the recording electrode 22 itself and the insulating film 34, from among bonding of foil material, electrolytic plating, electroless plating, spot electrolytic plating, vacuum deposition, printing method, PVD, CVD, plasma deposition, solvent coating and the like. The recording electrodes 22, 22, . . . are formed by removing the portions except for the portions for the recording electrodes 22, 22, . . . with the shape mentioned earlier, by a combination of lithography which utilizes a light, laser or electron beam and one of the various kinds of etching methods. It is also possible to form the patterned electrodes by direct drawing.

On the recording electrodes 22, 22, . . . there is formed an insulating film 35 extending over the entire substrate 33. In parts of the insulating film 35 there are provided square openings 36, 36, . . . for exposing the tip parts of the recording electrodes 22, 22, . . . . On each of the recording electrode 22, there is formed a protruded electrode 37 with thickness in the range of 2–100 μm by accumulating a material similar to that used for the recording electrode 22 by a method such as vapor deposition. The thickness of the protruded electrode 37 is desirable to be in the range of 10–40 μm. These protruded electrodes 37 are provided at positions about 10 –70 μm separated from the end of the recording electrodes 2. As a result of providing the protruded electrode 37 on the tip of the recording electrode 22, area of contact of the recording electrode 22 with the print recording medium 25 can be confined, so that it is possible to realize satisfactory printing of the recording dots.

As the material for the insulating film 35, a material similar to that of the insulating layer 34 is used.

Figure 17:
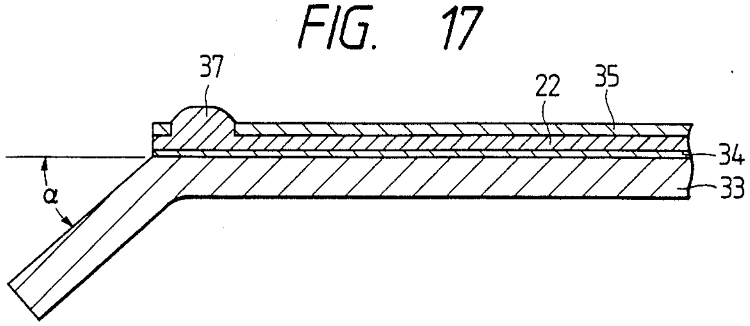
FIG. 17 and FIG. 18 are cross-sectional diagrams showing examples with different angles of bending part of the print recording head.
Figure 18:
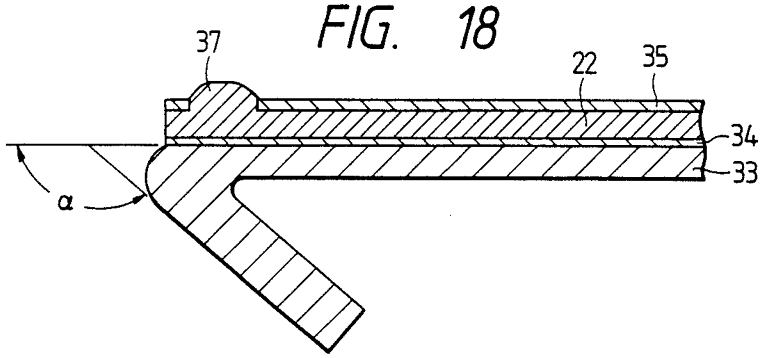

Now, in this embodiment, the tip part 33a projects from the end of the recording electrodes 22, 22, . . . , and the tip part 33a is bent to the tack side of the recording electrodes 22, 22, . . . . Namely, the tip part 33a of the substrate 33 extends by length of L from the end of the recording electrodes 22, 22, . . . , and the tip part 33a is bent by 90° to the back side to form a bending part 38. The length L of the bending part is desirable to be in the range of 100 μm to 30 mm and it is particularly desirable to be in the range of 1–10 mm because it is easy to bend and formation of the bending part can be accomplished with high precision. In addition, the bending angle α can be arbitrary, but the range of 30–180 degrees is desirable, and more particularly the range of 70–110 degrees is more desirable because it is possible to obtain a satisfactory linearity of the bent portion and a satisfactory elastic property. FIG. 17 and FIG. 18 shows examples of the cases where the bending angles α are 40° and 150°, respectively.

Further, the print recording head with the above constitution 21 has a tip part separated, as shown in FIG. 13, by the notched grooves 39, 39, . . . so that the respective recording electrodes 22, 22, . . . can make elastic deformation independent of each other.

With a print recording head having the abovementioned constitution, printing and recording can be accomplished in the following way. Namely, the print recording head 21 is constituted by forming the recording electrodes 22, 22, . . . in parallel on the elastic substrate 33 via the insulating layer 34. Therefore, even when there is an unevenness on the print recording medium 25 by the attachment of dirt or the like, the unevenness or the like can be absorbed by elastic deformation of the substrate 33, suppressing floating of the print recording head 21 and realizing printing and recording under satisfactory contacting condition. Further, the bending part 38 is provided on the tip of the substrate 33, so that it is possible to impart rigidity of a certain extent to the tip of the substrate 33. By virtue of this, even when elasticity is given to the substrate 33, undesirable deformation in the tip part of the substrate 33 can be prevented, and bending or reduction in linearity which might be caused as a result of giving elasticity to the substrate 33 can be prevented, permitting satisfactory printing of an image. Further, the notched grooves 39 are provided in the tip parts of the print recording head 21, as shown in FIG. 13, the bending part 38 contributes to prevent the occurrence of a distortion such as deflection or twisting in the tip part of each of the print recording head 21 separated by the notched grooves 39, 39, . . . one from another.

Figure 19:
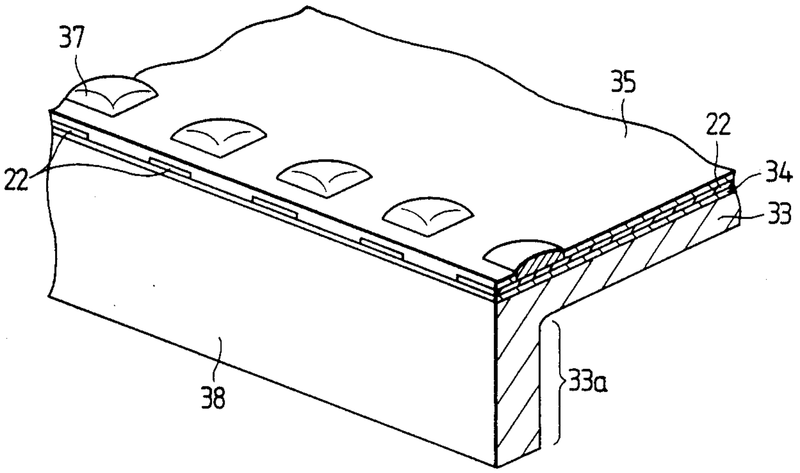
FIG. 19 is a perspective view showing another embodiment of the present invention.

FIG. 19 shows another embodiment of the print recording head in accordance with the second aspect of the present invention, identical symbols are attached to the same parts as those shown in FIG. 13. The notched grooves 39, 39, . . . are not provided in the tip parts of the print recording head 21, but instead the tip part of the print recording head 21 is formed integrally with the substrate 33. By so doing, it is possible to maintain the linearity of the tip part of the print recording head 21 still further. Other constitution and components are similar to the previous embodiments and detailed description for those will be omitted.

EXAMPLE 4

The present inventors actually manufactured a print recording head 21 with the constitution as shown in FIG. 13, and carried out an experiment to test its printing and recording characteristics. Phosphor bronze with thickness 120 μm was used as a substrate 33, and an insulating layer 34 with thickness 1,300 Å of $SiO_2$ was deposited by high frequency sputtering deposition on the surface of the substrate 33. Next, Cr was deposited to the thickness of 1,000 Å on the insulating layer 34 by high frequency sputtering, and then Cu was deposited on top of it to the thickness of 7,000 Å by vacuum vapor deposition, to form a conductive layer with a double-layer constitution. The conductive layer with the double-layer constitution was patterned by photolithoetching to form stripe-like recording electrodes 22, 22, . . . .

Next, a dry film of thickness 25 μm was bonded on the insulating layer 34 and the recording electrodes 22, 22, . . . , square openings with sides of 55 μm were formed on the recording electrodes 22, 22, . . . by exposure with ultraviolet rays and development, and protruded electrodes 37 with thickness 30 μm were formed on the recording electrodes 22, 22, . . . through the openings 36, 36, . . . by electrolytic plating. Next, the dry film was removed, and an insulating film 35 with thickness of 5 μm was given by applying a polyimide oligomer solution. Here, the solution was not applied to the top of the protruded electrodes 37 to leave them exposed. In this way a substrate was produced, in which protruded electrodes 37 were projected by 30 μm above the recording electrodes 22, 22, . . . made of copper, and by 25 μm above the insulating film 35.

Next, notched grooves 39, 39, . . . with a 500 μm pitch and 30 μm width were formed between the recording electrodes 22, 22, . . . over length of 30 mm in the tip part of the substrate thus produced, by means of a rotary cutting machine, to give an independent elastic property to each of the recording electrodes 22, 22, . . . . Then, the portion of the print recording head 21 was bent by 90° to the back side at the position 5 mm separated from the end, so as for the protruded electrodes 37, 37, . . . to be aligned at the position 15 μm inside from the bending line. In this manner, an L-shaped bending part 38 was formed on the tip of the substrate 33, and a print recording head 21 was manufactured.

Next, the print recording head manufactured in this manner was evaluated according to the following method.

A back roll 29 was the one which had been formed by depositing an aluminum material with 1 μm thickness on an aluminum drum with diameter of 100 mm which was covered on its surface with rubber of rubber hardness 60. The above-produced print recording head 21 was brought into pressure contact with the back roll 29 with a contact angle of 15°, while rotating the back roll 29 with linear velocity of 250 mm/sec and applying a pulse voltage from the print recording head 21. The contact condition was evaluated by using an oscilloscope with varing the contact condition. Namely, by defining "a pulse with faulty contact" as the one which had a 20% or more duration in which a voltage change of more than ±20% existed within the 1 msec pulse, an evaluation was carried out by representing the result as the rate of faulty contacts per 100 pulses. The result of the evaluation is as shown in Table 4 that follows.

COMPARATIVE EXAMPLE 5

A plate-like print recording head obtained by chopping the L-shaped bending part 38 off the print recording head which has the same structure as that of Example 4, was evaluated in the same manner as in Example 4.

COMPARATIVE EXAMPLE 6

Using a print recording head with the same structure as in Example 4, except that a fairly thin material of thickness 30 μm was used for the substrate 33, was evaluated in the same manner as in Example 4.

COMPARATIVE EXAMPLE 7

Using a print recording head with the same structure as in Example 1 except that an extremely thick material of thickness 1.0 mm was used for the substrate 33, was tested and evaluated in the same manner as in Example 1.

TABLE 4

| | Contact Pressure | | |
|---|---|---|---|
| | 5 g/cm | 50 g/cm | 200 g/cm |
| Example 4 | 8% | 0% | 0% |
| Comparative Example 5 | 18% | 9% | 6% |
| Comparative Example 6 | 35% | 14% | No occurrence of pressure |
| Comparative Example 7 | 83% | 19% | 4% |

As can be seen from the Table 4, in the case of Example 4, these occurred 8% of faulty contacts when the contact pressure was fairly small as 5 g/cm. However, in the cases of the contact pressure of 50 g/cm and 200 g/cm which are close to the normal condition of use, there occurred absolutely no faulty contact. In contrast, in the case of Comparative Example 5, these occurred 18% of faulty contacts in the case of the contact pressure of 5 g/cm, with a decrease in the number with the increase in the contact pressure, but not attaining 0%. In the case of Comparative Example 6, occurrence of faulty contact was considerably high rate of 35% for the case of 5 g/cm of the contact pressure, reduced to 14% for the pressure of 50 g/cm, and there was produced no pressure for pressurized contact of 200 g/cm. This is considered due to plastic deformation caused by the application of a large contact pressure to the thinner substrate 33. In the case of Comparative Example 7, faulty contacts occurred for nearly all cases with the rate of 83% for the contact pressure of 5 g/cm, reduced to 19% when the contact pressure was 50 g/cm, and there still occurred 4% of faulty contacts for the case of 200 g/cm of the contact pressure.

In the third aspect of the present invention, the constitution and the action of the print recording head are as described in the foregoing. Since the bending part is provided in the tip part of the substrate, it is possible to impart rigidity to the tip part of the substrate. Therefore, even in the case where unevenness or the like in the print recording medium is made to be absorbed by giving elasticity to the substrate, it is possible to prevent the occurrence of deflection or distortion in the substrate to secure a satisfactory contacting condition with the surface of the recording medium. This enables one to obtain an image with high reproducing quality.

In a fourth aspect of the present invention, a current flows from a recording electrode to a heating resistor layer through an electrically conductive ceramic, in the state where the conductive ceramic slides against the heating resistor layer.

Figure 20:
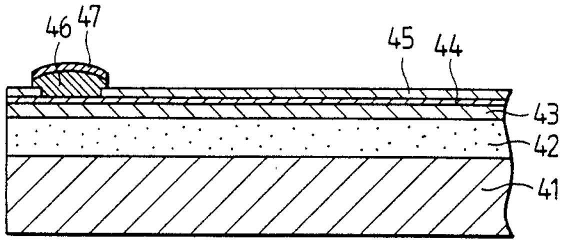
FIG. 20 is a cross-sectional diagram showing an example of the construction of a print recording head in accordance with a fourth aspect of the present invention.

FIG. 20 is a longitudinal cross-sectional diagram showing an example of constitution of a print recording head in accordance with the fourth aspect of the present invention.

In the figure, an elastic layer 42 such as rubber is formed on a rigid substrate 41, and on top of it there are disposed recording electrodes 44 via an insulating film 43. The print recording head has a structure in which the recording electrodes 44 are covered with an insulating film 45 excluding the tip parts of the recording electrodes 44, metallic protrusions 46 that are connected to the respective recording electrodes 44 are formed in the portions that are not covered with the film 45, and the surface of each of the protrusions 46 is coated with an electrically conducting ceramic 47. The elastic layer 42 has a function (faulty contact preventing function) which maintains a condition of sure contact of the recording electrodes 42 (protrusions 46) to a recording medium even when, in particular, there exists unevenness or the like in the recording medium.

A print recording head with the structure as described in the above can be manufactured, for example, as follows. First, using a polyimide film with thickness of 15 μm as a base film (insulating film) 43, and a copper foil with thickness 20 μm is bonded on top of the base film 43 by means of an epoxy thermosetting adhesive. Then, a plurality of electrode stripes (recording electrodes) 44 that are arranged in parallel are formed with width of 50 μm and a pitch of 125 μm by patterning the copper foil with photolithography and etching. Further, a photosensitive insulating film 45 of thickness 15 μm is thermally pressure-bonded to these electrode stripes, and the portions of the photosensitive insulating film 45 corresponding to the electrode stripes 44 are removed in a square of 40 μm×40 μm. Then, nickel is grown in these opening portions by electrolytic plating to form protrusions 46 which are projected by 15 μm from the surface of the insulating film 45. Following that, tantalum nitride compound (electrically conductive ceramic) is deposited on top of it by reactive sputtering to the thickness of about 1,000 Å, and a conductive ceramic layer 47 is formed on the surface of each of the protrusions 46 by removing the tantalum nitride compound by means of photolithography and etching except for the portions of the protrusions 46. Then, an electrode plate sheet is obtained by cutting off the electrode sheet at the position 10 μm separated from the edge of the protrusions 46 that are arranged in parallel.

With an aluminum plate with thickness of 3 mm as a rigid plate 41, an elastic body 42 made of silicon rubber (with spring strength of 46) of thickness 1 mm, and further on top of it, the electrode sheet formed in the above, are laminated so as to have their end faces just aligned each other. By bonding these laminating layers by means of an epoxy thermosetting adhesive, there is obtained a print recording head with constitution as illustrated in FIG. 20 which has a printing density of 8 lines/mm. It should be noted that the size of each component in the above is just for illustrative purposes and should not be construed to limit the present invention to any extent whatsoever.

Results of abrasion test given to the print recording head of the invention manufactured as in the above, and a print recording head (Comparative Example) obtained by the manufacturing process in the above in which there was not formed a layer of the tantalum nitride compound on the surface of each of the protrusions 46, will be described in what follows.

In the test, value of the electric current was monitored and changes in the conduction state was observed in the state of pressurized contact of a print recording head in question under the conditions of:

| | |
|---|---|
| contact angle | 15° |
| contact pressure | 800 g/cm |
| applied voltage | 0.2 V |

to an aluminum drum with diameter of 10 cm which was rotated at the speed of 60 rpm.

The non-defective rate of the electrode portions (the protrusions 46) after 10,000 revolutions is as shown in the following Table 5.

TABLE 5

| | Sample of Invention | Comparative Example |
|---|---|---|
| Initial Value | 100% | 100% |
| After 10,000 Revolutions | 95% | 65% |

From the result shown in the above table, it can be seen that the print recording head of the invention has a superior abrasion resistance than the comparative example.

Further, microscopic observation of the condition of the electrode portion after 10,000 revolutions revealed that there was seen scarcely any abrasion in the invention sample whereas abrasion was so severe that the protrusions 46 were practically gone in the comparative example. Moreover, in contrast to an approximately constant change in the resistance value for the invention samples, there were observed in the comparative example samples with reduced resistance value due to increase in the contact surface as a result of abrasion, samples with increased resistance value due to decrease in the contact area as a result of complete abrasion, samples which showed no current conduction, samples with increased resistance value as a result of oxidation of the surface of protrusion 46 and the like.

Desirable conditions for the conductive ceramic are:

| | |
|---|---|
| specific volume resistivity | smaller than $10^2$ Ωm, and preferably smaller than $10^{-2}$ Ωm |
| melting point | greater than 1,500° C. |
| hardness | Vickers' hardness of 1,000. |

Specifically, simple substance or mixture of the following may be considered appropriate for the conductive ceramic. Namely,

| | |
|---|---|
| oxides | $RiO_2$; |
| nitrides | $Ta_2N$ (or TaN), TiN, ZrN, NbN and VN; |
| borides | $TiB_2$, $ZrB_2$, $HfB_2$, $TaB_2$, $MoB_2$, $CrB_2$, $NbB_2$, MoB, NbB and $Mo_2B$; |
| carbides | BC, TiC, ZrC, HfC, VC, NbC, WC, $W_2C$ and TaC; |
| silicides | $MoSi_2$, $TaSi_2$ and $WSi_2$. |

Further, the thickness of the conductive ceramic layer 47 to be formed on the protrusion 46 is preferable to be in the range of 300Å to 5 μm. This is because if the layer is thinner than 300 Å, there is a possibility of producing pinholes with a result that oxidation tends to develop from these pinholes. On the other hand, if it is thicker than 5 μm, material selection is narrowed in conjunction with the electrical conductivity, or longer time is taken in the film formation.

Figure 1:
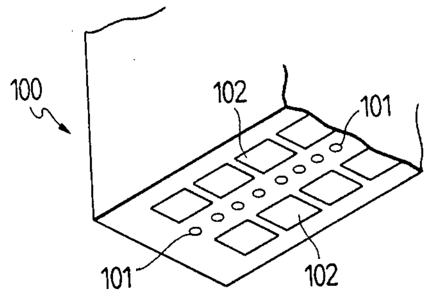
FIG. 1 PRIOR ART
FIG. 1 is a perspective view showing a prior art print recording head.
Figure 2:
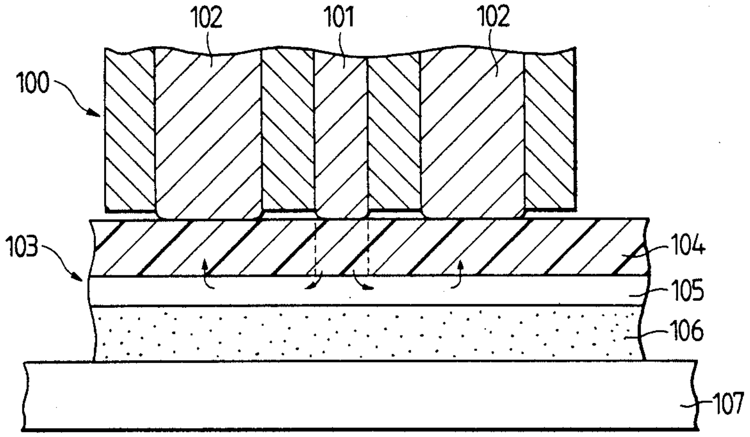
FIG. 2 PRIOR ART
FIG. 2 is a cross-sectional diagram for the printing part of the above device.
Figure 3:
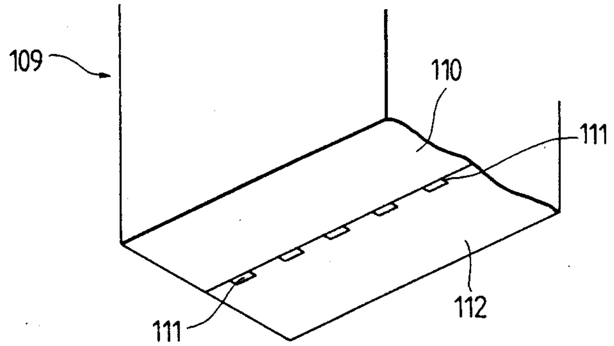
FIG. 3 PRIOR ART
FIG. 3 is a perspective view showing another prior art print recording head.
Figure 4:
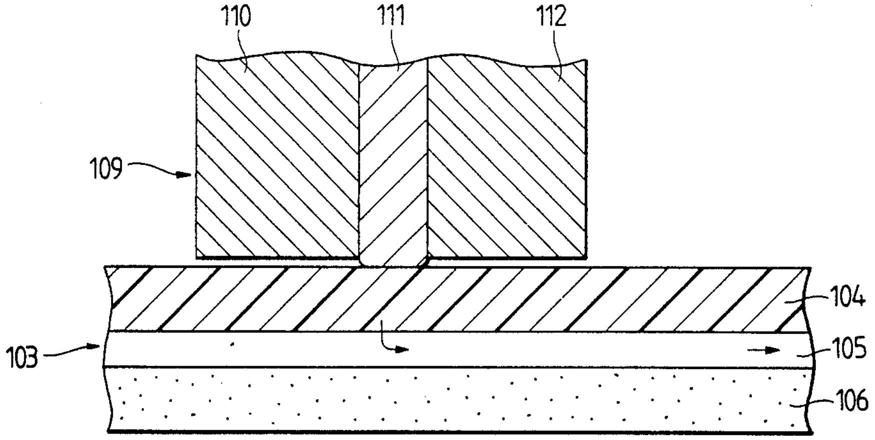
FIG. 4 PRIOR ART
FIG. 4 is a cross-sectional diagram for the printing part of the device of FIG. 3.
Figure 5:
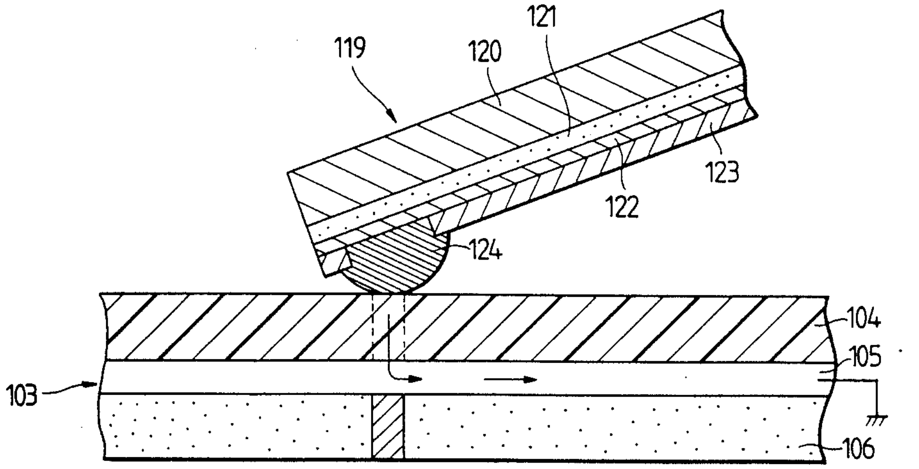
FIG. 5 PRIOR ART
FIG. 5 is a cross-sectional diagram for the printing part of still another prior art print recording head.
Figure 6A:
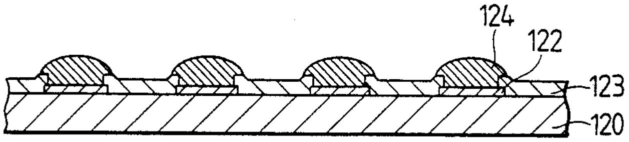
FIG. 6(a) PRIOR ART
FIG. 6 is a diagram showing an example of the structure of still another prior art print recording head.
Figure 6B:
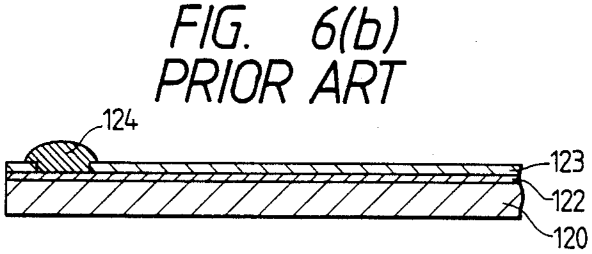
FIG. 6(b) PRIOR ART
Figure 7:
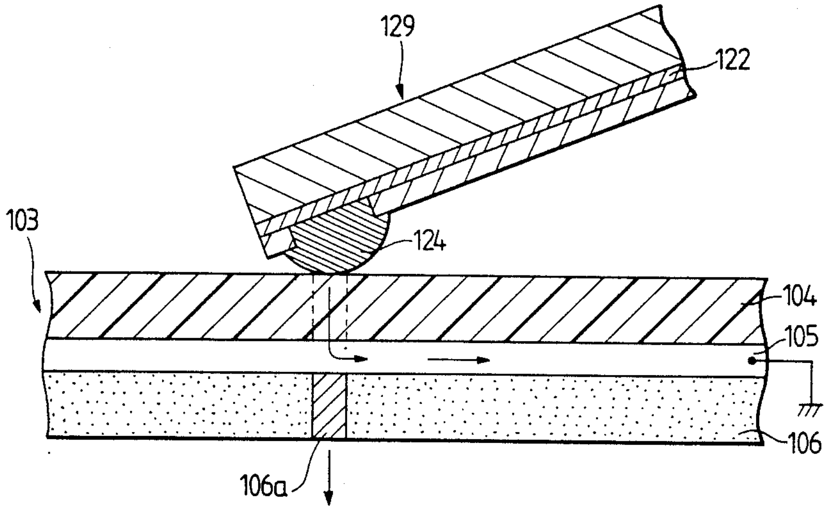
FIG. 7 PRIOR ART
FIG. 7 is a diagram stowing an example of the printing condition by the use of a print recording head.
Figure 21:
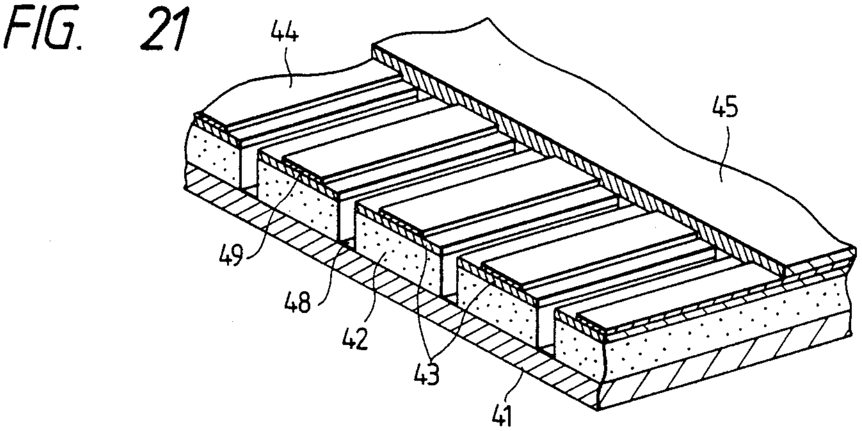
FIG. 21 and FIG. 22 are perspective views showing other examples of the print recording head in accordance with the present invention.
Figure 22:
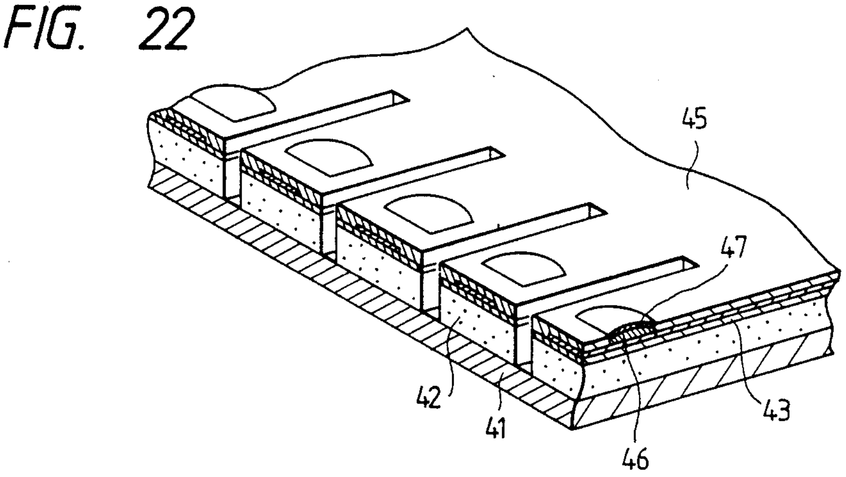

On the other hand, the overall structure of the print recording head according to the fourth aspect of the present invention is not limited to that shown in FIG. 20 (which is fundamentally the same as that shown in FIG. 6), but may have a constitutions, for example, as shown in FIG. 21 and FIG. 22.

In the example shown in FIG. 21, a rigid plate 41, elastic body 42, insulating film 43, recording electrodes 44 are laminated in succession, and further, an insulating film 45 covers the top so as to expose the ends 49 of the recording electrodes 44. In this case, a conductive ceramic layer is formed on the exposed ends 49 of the recording electrodes 44 without providing protrusions 46 described in the foregoing. Further, grooves 48 are formed in the elastic body 42 so as to partition the recording electrodes 44. This arrangement brings about such an effect that the influence of unevenness on the sliding surface is not propagated to other electrodes, and other effects.

Furthermore, in the example shown in FIG. 22, a conductive ceramic layer 47 is formed on each of the protrusions 46, which is similar to the embodiment shown in FIG. 20. However, in this embodiment, the electrodes 44 are partitioned by providing grooves 48 in the elastic body 42.

As described in the above, according to the fourth aspect of the present invention, there is formed the conductive ceramic layer on the surface of the protrusion which slides against the recording medium. Therefore, abrasion resistance of the sliding surface of the recording electrode can be improved, and oxidation of the exposed surface can be prevented. These effects are obtained from the properties of the conductive ceramic which will be described below.

The conductive ceramic has a satisfactory abrasion resistance because of its so-called high hardness; its melting point is high, so that damages due to discharge and heating are less severe; electromigration (transfer and shifting of substance) in the electrode due to electric current flow or discharge can be suppressed; oxidation and deterioration of the electrode material due to ionization in the gaseous layer caused by electric current flow or discharge can be suppressed.

As a result of these properties, abrasion of the sliding surface and oxidation of the exposed surface can both be suppressed and the life of the print recording head can be prolonged.

What is claimed is:

1. A print recording head for applying to each one of selected spots in a print recording medium of the type including a heating layer and a layer having meltable ink to generate heat within the spot of the heating layer to melt in the ink layer ink adjacent to the spot, comprising an elastic substrate member comprising a metallic plate of thickness in the range of 30 μm to 800 μm and an insulating layer disposed on the metallic plate;

a plurality of recording elements disposed in parallel form on said elastic substrate member;

protrusions made of a conductive material, each being formed on a tip part of each of said plurality of recording elements;

an insulating layer formed on said elements except for said protrusions; and notched grooves formed between said elements and extending at least to said tip part of the adjacent ones of said recording elements.

2. A print recording head as claimed in claim 1, in which:

every adjacent pair of said recording elements has therebetween one of said notched grooves.

3. A print recording head as claimed in claim 1, in which every adjacent pair of selected groups of said recording elements has therebetween one of said notched grooves.

4. A print recording head for applying to each one of selected spots in a print recording medium of the type including a heating layer and a layer bearing meltable ink to generate heat within the spot of the heating layer to melt in the ink-bearing layer ink adjacent to the spot comprising:

a substrate member;

a plurality of recording elements disposed in parallel form on said substrate member;

protrusions made of a compound material of a metallic matrix material and ceramic particulates, each being formed on a tip part of each of said plurality of recording elements; and an insulating layer formed on said elements except for said protrusions.

5. A print recording head as claimed in claim 4, wherein said substrate is formed of an elastic material.

6. A print recording head as claimed in claim 5, further comprising notched grooves formed between selected adjacent ones of said recording elements and extending at least to said tip part of one of said recording elements.

7. A print recording head as claimed in claim 4, wherein said protrusions comprise protrusions plated on said elements.

8. A print recording head for applying to each one of selected spots in a print recording medium of the type including a heating layer and a layer bearing meltable ink to generate heat within the spot of the heating layer to melt in the ink-bearing layer ink adjacent to the spot comprising:

an elastic substrate member; and a plurality of recording elements disposed in parallel form on said elastic substrate, a contactable conducting tip portion for each of said elements and an insulating outer layer thereof except for said tip portion, said elastic substrate member having a bent portion backing said tip portion of each of said elements to provide more rigidity to said tip portion than to the remainder of said element.

9. A print recording head as claimed in claim 8, wherein said elastic substrate member and said plurality of recording elements together have notched grooves between and parallel said recording elements and extending respectively at least to the tip portions of said recording elements.

10. A print recording head for applying to each one of selected spots in a print recording medium of the type including a heating layer and a layer bearing meltable ink to generate heat within the spot of the heating layer to melt in the ink-bearing layer ink adjacent to the spot comprising:

a substrate member; and a plurality of recording elements disposed in parallel form on said substrate member, each having a conducting tip portion coated with a conductive ceramic layer and having an insulated remainder portion, said ceramic layer having a protruding convey surface of slidable smoothness.

11. The print recording head of claim 10 in which at least the ceramic layer of the tip portion protrudes beyond the insulated remainder portion.

12. A method of using a print recording head of the type having a plurality of flexible elements of current-conducting type with slidable contact tips, comprising the steps of:

bringing the protruding contact tips into slidable contact with a recording medium of the type including heating and ink-bearing layers; and applying an electrical signal to selected ones of said elements to heat contacted spots of the medium to melt ink from only portions of the ink-bearing layer adjacent to spots defined by the slidable contact of each of said tips.

13. The method of claim 12 in which the step of bringing into contact comprises bringing the protruding contact tips into contact with the flexible elements each inclined with respect to the area of the slidable contact.

14. The method of claim 12, in which the slidable contact tips each have a protruding, slidable contact surface, and the step of bringing into contact comprises bringing the protruding slidable contact surface into sustainable slidable contact with the heating portion of the medium.

* * * * *

UNITED STATES PATENT AND TRADEMARK OFFICE
CERTIFICATE OF CORRECTION

PATENT NO. : 4,980,705

DATED : December 25, 1990

INVENTOR(S) : Eiichi Akutsu et al.

It is certified that error appears in the above-identified patent and that said Letters Patent is hereby corrected as shown below:

Claim 10, Column 24, Line 33, change "convey" to --convex--; and

Signed and Sealed this

First Day of December, 1992

*Attest:*

DOUGLAS B. COMER

*Attesting Officer*

*Acting Commissioner of Patents and Trademarks*